Sept. 14, 1954 H. J. MODREY 2,688,894
ROTATABLE FASTENER HAVING ELASTICALLY DEFORMABLE SLEEVE
Filed May 11, 1951 2 Sheets-Sheet 1

INVENTOR.
HENRY J. MODREY
BY
ATTORNEY.

Sept. 14, 1954  H. J. MODREY  2,688,894
ROTATABLE FASTENER HAVING ELASTICALLY DEFORMABLE SLEEVE
Filed May 11, 1951  2 Sheets-Sheet 2

INVENTOR.
HENRY J. MODREY
BY
ATTORNEY.

Patented Sept. 14, 1954

2,688,894

UNITED STATES PATENT OFFICE 2,688,894

ROTATABLE FASTENER HAVING ELASTICALLY DEFORMABLE SLEEVE

Henry J. Modrey, North Stamford, Conn.

Application May 11, 1951, Serial No. 225,740

1 Claim. (Cl. 85—2.4)

This invention relates to rotatable fastener having elastically deformable sleeve for detachably clamping or locking together two or more members in juxtaposed positions, for instance for clamping a panel-like member to a chassis, rack or cabinet, and also to anti-vibration fasteners attachable to a support.

There are known in the art mounts for releasably fastening one part to another part in which a completely relaxed flexible member secured to one part is inserted in a receiving opening of the other part and anchored therein by bulging due to axial compression effected by tightening a screw extending into the elastic member. The disadvantage of such an arrangement is that it cannot withstand vibrations. As it is well known, all screws open under vibration.

There are also known in the art devices in which an elastic member is moved from a relaxed position into a compressed position by means of a pin riding of a cam surface of the elastic member and fastened to a stem extending through the elastic member and secured to one of the parts to be clamped together. Devices of this type, as hitherto known, require special holding means to impede rotation of the pin together with the elastic member rather than relative thereto. Such joint rotation of the pin and the elastic member is due to the absence of sufficient friction between the engaging surfaces until the beginning of the deformation and compression of the elastic member. As will be obvious, the elastic member cannot be brought into its compressed condition without a relative rotation between the cam surface and the pin.

Finally, there are fasteners known which require special receiving elements or at least a special cooperating configuration of the receiving hole.

It is of course technically possible to provide satisfactory holding means and receiving elements, so as to prevent relative rotation. However, it should be kept in mind that the product in question is a typical mass production item for which utmost simplicity of production, component parts, and especially of installation are of vital importance. As far as the applicant herein is aware, there is not yet available a "self-starting" fastener of the general type, above referred to, which fully satisfies the aforementioned requirements as to simplicity and which is truly vibration proof and capable of joining two parts in a substantially moisture or dust proof fashion.

Accordingly, one of the objects of the present invention is to provide a novel and improved self-starting fastener of the general type, above referred to, which is vibration proof for all practical purposes so that the fastener is highly suitable for applications where it is exposed to vibrations such as aircraft and motor vehicles.

Another object of the invention is to provide a novel and improved fastener which is self-contained in that it can be completely assembled on one member and is captive to the said member when assembled. This facilitates use of the fastener and has also the advantage that the assembled fastener can serve directly as a support, for instance by designing the fastener stud or stem as a hook.

Another object of the invention is to provide a fastener which permits to clamp together two or more members so that there is no metallic contact between the members. As a result, the fastener can also serve as an electric insulation.

Another object is to provide a novel and improved fastener which is extremely simple in design and inexpensive in manufacture since the fastener according to the invention consists only of a few simple parts and does not require any special holding means for initiating the locking or clamping action but is self-starting.

According to a more specific object of the invention, allied with the preceding one, the fastener or more particularly the elastic member thereof is designed so as to prevent ingress or seepage of water, dust or oil, the lubricating effect of which might impede the self-starting function of the fastener and an unlocking of the tightened fastener.

Another object of the invention is to provide a novel and improved fastener which can be easily and conveniently assembled and disassembled.

Another object of the invention is to provide a novel and improved fastener which can be applied to the two or more parts to be joined together by means of a simple, for instance circular opening in each of the said parts, thereby making it very simple and inexpensive to ready the said parts for the assembly of the fastener.

In addition to aircraft and motor vehicles already mentioned, fasteners according to the invention are particularly suitable for mounting of instruments, instrument panels and boxes, small motors for refrigerators, fans, air conditioners, etc., and household appliances. Many other fields of application will readily suggest themselves to persons skilled in the art.

Other and further objects, features and advantages of the invention will be pointed out hereinafter and set forth in the appended claim forming part of the application.

In the accompanying drawing several now preferred embodiments of the invention are shown by way of illustration and not by way of limitation.

Figure 1:
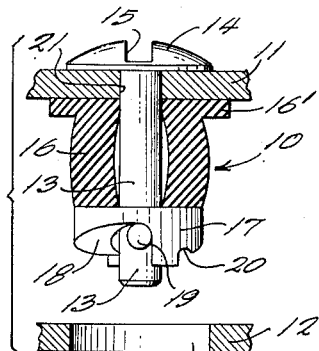
Fig. 1 is a side view, partly in section, of an anti-vibration fastener according to the invention, the two members to be clamped together being shown separated.

Referring first to Figs. 1 to 4 inclusive in detail, these figures show an anti-vibration fastener, generally desigated by 10, for vibration proof clamping or joining together two members 11 and 12.

Member 11 may represent a panel, a cover plate, a closure member, an instrument, etc., and member 12 may represent a chassis, a rack, a cabinet, a frame or any other support for member 11.

Member 12 may be visualized as a fixed or supporting member and member 11 as a movable or supported member. Fastener 10 is shown as being mounted on member 11, but it should be understood that it could also be mounted on member 12 assuming, of course, the provision of proper holes.

The anti-vibration fastener 10 comprises a stud having a stem 13 and an enlarged head 14 preferably provided with a transverse slot or kerf 15 to facilitate turning of the slot by means of a screw driver or a coin. A sleeve 16 made of elastic and vibration suppressing material, such as rubber or a rubber composition, is slidably and rotatably supported on stem 13. This sleeve, when completely relaxed, is cylindrical but it is shown slightly bulged for reasons which will be more fully explained hereinafter. The term "elastic," as herein sometimes used, is intended to refer to any suitable material which, when subjected to pressure, will yield and be deformed and which will return into substantially its original shape upon relaxation of the pressure. The sleeve ends at one end in a collar 16' which may be integral with the main body of the sleeve or be formed by a separate washer. The stem further supports a cam plate 17 having a substantially smooth surface on the side facing sleeve 16 and on the opposite side a cam surface 18 which preferably has a transverse groove 20 therein. The cam plate is preferably made of a substantially rigid material such as plastic or metal. As will be noted, the length of stem 13 is so selected that the stem protrudes from the cam plate. The cam plate and the sleeve are secured on stem 13 by means of a projection or nose laterally extending from the stem. This projection is shown as a pin 19 inserted in a corresponding transverse hole in stem 13. Pin 19 may be cranked, as can best be seen in Fig. 2, indented, notched or otherwise suitably set-off.

Pin 19 is riding on cam surface 18 so that the axial position of cam plate 17 on stem 13 will be controlled within certain limits by the position of the pin relative to the cam surface.

Member 11 is provided with an opening 21 corresponding in diameter substantially to the diameter of stem 13, and member 12 is provided with an opening 22. This latter opening may correspond, as is shown, in diameter substantially to the largest diameter of bulged sleeve 16.

Sleeve 16 when relaxed, collar 16' and cam plate 17 have a generally cylindrical shape. However, it should be understood that these parts of the fastener may also have any other suitable cross-section. Furthermore, a different cross-section may be selected for the sleeve and the cam plate, provided only that both parts can be passed through opening 22 when mounted on the stud, and that collar 16' is wider than opening 22.

As will be evident, there is a cam plate position of maximal distance between cam plate 17 and stud head 14 and a position of minimal distance between the cam plate and the stud head.

As previously mentioned, sleeve 16 is substantially cylindrical or straight when completely relaxed. According to one of the most essential features of the invention, the sleeve is never in a fully relaxed condition when the fastener is assembled but held by pin 19 in a precompressed and axially deformed condition even when the cam plate is in the position of maximal distance representing the open position of the fastener. This precompressed or axially shortened condition of the sleeve is indicated in Fig. 1 by a somewhat exaggerated bulge. As a result, there is a considerable friction between the pin and the cam surface already in the open position of the fastener.

Let it be now assumed that it be desired to assemble the anti-vibration fastener on member 11 and to secure the said member to member 12, then the stud is first passed through opening 21. The sleeve and the cam plate are slipped on stem 13 and secured by inserting pin 19 in the position shown in Fig. 1. All the parts are now in the positions shown in the upper half of Fig. 1 in which the cam plate is in a position of maximal distance and sleeve 16 is slightly precompressed. As previously explained, the axial lengths of sleeve 16 and, of course, also of collar 16' and of cam plate 17 and the position of pin 19 relative to stem 13 are so selected that for a given thickness of member 11, there is a certain friction in the open position of the fastener between the engaging surfaces, that is, between the end faces of the cam plate and the sleeve and between the end faces of the sleeve or its collar and member 11. This friction is already sufficient to cause the cam plate and the sleeve to remain stationarily relative to member 11 without special holding means when the stud with pin 19 is rotated within the sleeve and the cam plate. Once the fastener is started toward the locking or clamping position, the initial friction holding the sleeve stationarily is gradually increased by the pressure of the bulging sleeve wall against the wall defining opening 22.

Figure 4:
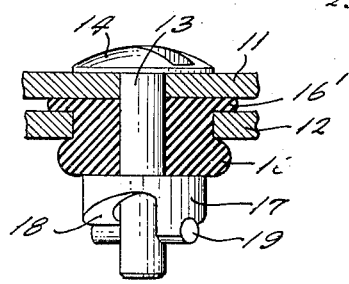
Fig. 4 is a side view of the fastener of Fig. 1, the two members being clamped together.

For the purpose of clamping member 11 to member 12, the cam plate and the slightly bulged sleeve are passed through opening 22 until members 11 and 12 are juxtaposed to each other with the collar 16' therein-between (see Fig. 4). When now the stud is turned from the open position as shown in Fig. 1 toward the locking position as shown in Fig. 4, pin 19 will ride upwardly on the cam surface until the pin finally reaches the locking position shown in Fig. 4, in which it engages groove 20.

As will be apparent, the pin rides over the highest portion of the cam surface before it drops into groove 20. In other words, the locking or clamping position of the fastener is a position in which the cam plate is at a distance from the stud head slightly longer than the minimal distance, the cam plate being in the said position of minimal distance when the pin passes over the highest portion of the cam surface. Groove 20 serves several purposes. It retains the pin and, hence, the fastener in the locking position; it causes a sharp click when the pin falls into the groove; and it helps to secure the pin in its position in the stem. The retention of the pin in the groove is essential to prevent accidental unlocking of the fastener due to the pin sliding down the cam surface as a result of vibrations or shock. The click signals that the fastener is locked. This is very helpful with fasteners of the type, herein referred to, since forceable rotation of the stud after locking of the fastener will result in rotation of the entire fastener in the locking position which may damage the fastener. As to the retention of the pin in the stem, the precompression of the sleeve presses the cam plate against the pin with a certain friction when the fastener is open. This friction and the set off shape of the pin are sufficient to retain the same in its position in the stem when the fastener is in its open position. If now the fastener is locked and the pin is in groove 20, the aforementioned frictional pressure upon the pin is considerably increased and the shoulders of the pin are strongly pressed against the respective edges of the cam plate. As a result, the pin cannot free itself from the groove and also not work itself sideways out of the stem even if the fastener be subjected to continuous and strong vibrations or shocks.

The rotation of the pin along the cam surface will gradually force the cam plate toward member 11, the axial position of pin 19 remaining unchanged. Consequently, sleeve 16 will be further axially shortened and bulge out still more as can best be seen in Fig. 4. The strongly bulged portion of the sleeve now protrudes beyond the diameter of opening 22 so that the fastener and with it member 12 are secured to member 11 and the pressure of the compressed rubber sleeve will hold the two members tightly together.

The pre-compression and even more the final compression of sleeve 16 result not only in an outward bulging of the sleeve but also in a strong frictional pressure of the respective end face of the sleeve against the adjacent surface of member 11 and also internally against stem 13 near member 11. This pressure and also the pressure between the other engaging surfaces of the fastener seals holes 21, 22 against the ingress of moisture, dust and oil and also protects the fastener against moisture and oil seeping between the engaging surfaces of the assembly between which friction must be maintained. This protection is particularly important because the fasteners will be often used near oiled devices and loss of friction due to oil or moisture may result in a failure of the aforementioned self starting action of the fastener and prevent an unlocking of the fastener due to slippage.

By reason of the inherent elasticity of the rubber sleeve, the fastener automatically compensates to a certain extent for distortion and misalignment of the components to be joined.

As can best be seen on Fig. 4, collar 16' which is also under pressure by the axial displacement of cam plate 17 separates members 11 and 12. As a result, collar 16' serves as a cushion for member 11 and absorbes or suppresses at least to an appreciable extent vibrations and shocks to which members 11 and 12 may be subjected. In other words, member 11 is floating upon member 12. The disposition of collar 16' between the two members also serves to insulate the two members electrically from each other by reason of the insulation properties of the collar material.

When it is desired to unlock the fastener, the stud is simply returned into its original position. The friction holding stationarily the sleeve and the cam plate relative to members 11 and 12 when the fastener is locked is strong enough to permit pin 19 to ride out of groove 20 when the stud is turned for unlocking the fastener. Sleeve 16 can now resume its original only slightly bulged condition so that the entire fastener can be withdrawn through opening 22.

As will appear from the previous description, the entire operation required for locking or unlocking of the fastener consists in a rotation of the stud in clockwise or counterclockwise direction. All the components of the fastener are supported on one of the members only and the fastener can be used repeatedly since none of its components is permanently deformed.

It will further be evident from the previous description that it is essential for the operation of the fastener that the sleeve 16 is precompressed or preloaded sufficiently to hold the cam plate substantially stationarily. Without such preloading of the sleeve and the resulting friction between the end faces of the sleeve and th abutting surfaces, the pin would not ride along the cam surface upon rotation of the stud but would carry with it the cam plate and possibly also the sleeve.

For certain fields of application, the suppression of vibration and the insulation afforded by collar 16' are not necessary, the antivibration effect of sleeve 16 being sufficient. In such instances, collar 16' is omitted so that members 11 and 12 abut directly against each other when clamped together.

Figure 5:
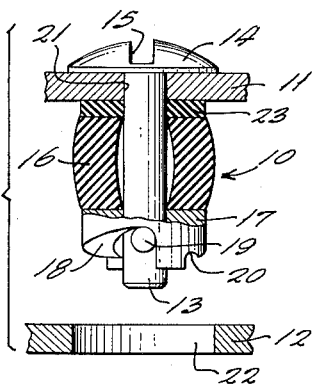
Fig. 5 is a sectional view similar to Fig. 1 showing a modification of the anti-vibration fastener.
Figure 6:
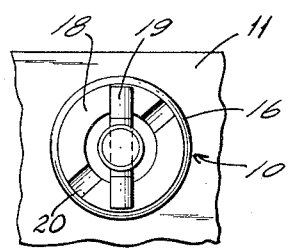
Fig. 6 is a bottom plan view of the fastener of Fig. 5.
Figure 7:
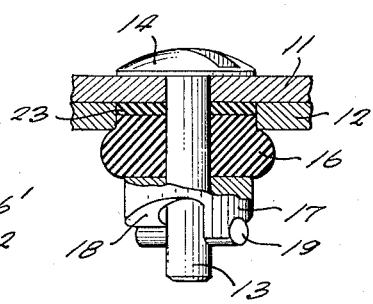
Fig. 7 is a view similar to Fig. 4 showing the modified fastener clamping the two members together.

Figs. 5 to 7 show an arrangement of this type. The anti-vibration fastener according to this figure is similar to the fastener according to Figs. 1 to 4 in all respects except that rubber collar 16' is omitted.

The operation of the fastener according to Figs. 5 to 7 will be obvious from the previous explanations.

The axial length of the fastener can be conveniently adapted within certain limits to the requirements of a particular application by cutting the sleeve or the collar to size or, as shown in Figs. 5 and 7, one or more washers or spacers 23 may be provided. These washers have an axial thickness less than the thickness of member 12 and are preferably also made of rubber so that they may be considered as part or extension of the sleeve.

Figure 8:
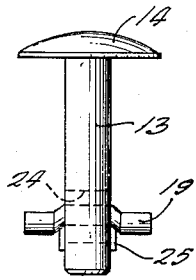
Figs. 8 and 9 are elevational side views of a modified component of a fastener according to the invention.
Figure 2:
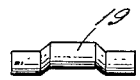
Fig. 2 is a detail view of one of the components of the fastener.
Figure 9:
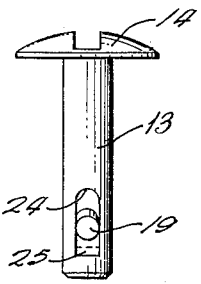
Figure 3:
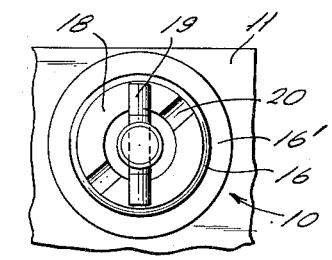
Fig. 3 is a bottom plan view of the fastener of Fig. 1.

Instead of adjusting the axial length of the sleeve and/or of the cam plate to the requirements of a particular application, it is also possible to provide for adjustment of the axial pin position. Figs. 8 and 9 show arrangements of this type.

According to Figs. 8 and 9, an axially elongated slot 24 is provided in stem 13. The axial position of pin 19 in this slot is then fixed by an insert 25 resting upon the bottom of the slot. As will be evident, the pressure of loaded sleeve 16 will secure the pin and the insert in the slot. By employing inserts of different size, the axial position of the pin can be adjusted within the limits of slot 24.

As will be evident, more than two members can be clamped together, provided each member has either an opening 21 or an opening 22.

Figure 10:
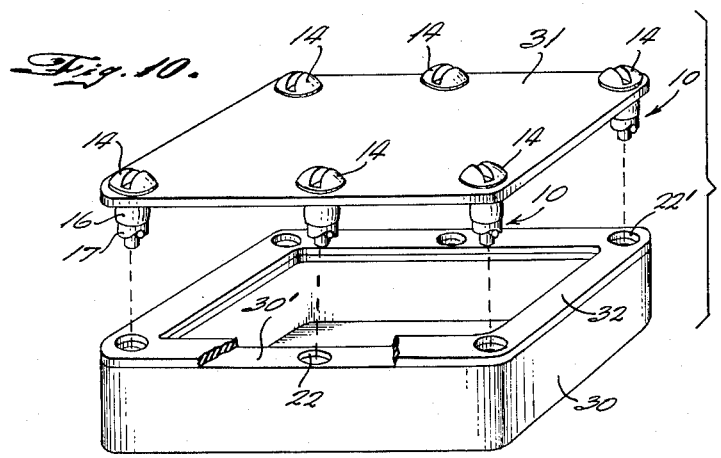
Fig. 10 is a perspective exploded view of an instrument housing the lid of which is secured to the box by means of fasteners according to the invention.

Fig. 10 shows a substantially rectangular box 30 having an inwardly turned lip 30' on its open side. The lid of the box is designated by 31. An elastic gasket 32 made for instance of rubber may be fitted between the lid and the box for sealing the box against moisture and dust. For the purpose of detachably locking the lid to the box, a plurality of fasteners according to the invention are provided. These fasteners may be of the type shown in Figs. 1 and 3 or 5 and 6, gasket 32 taking the place of the collar 16' of Fig. 1. The arrangement of the fasteners will be readily understandable from the previous description. It suffices to say that the fasteners proper are assembled on the lid while the receiving openings 22 are provided in lip 30' of the box. However, it is of course also possible to mount the fasteners on the lip and to provide the openings in the lid.

Of course, the receiving openings 22 must be extended through the gasket, the gasket openings being designated by 22'.

Figure 11:
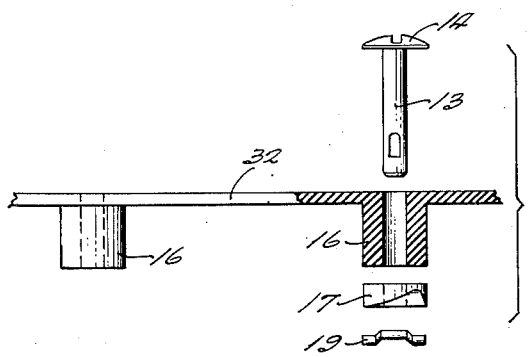
Fig. 11 is a fragmentary view of a gasket for use in connection with fasteners according to the invention.

As is shown in Fig. 11, sleeve 16 can be molded directly to the gasket or otherwise be made integral therewith. It will be obvious that a sleeve molded to the gasket must also be precompressed when the fastener is in its open position to prevent rotation of the cam plate 17 together with the locking pin.

While the invention has been described in detail with respect to certain now preferred examples and embodiments of the invention it will be understood by those skilled in the art after understanding the invention, that various changes and modifications may be made without departing from the spirit and scope of the invention, and it is intended, therefore, to cover all such changes and modifications in the appended claim.

What is claimed as new and desired to be secured by Letters Patent is:

An anti-vibration fastener assembly for releasably fastening together a plurality of generally plate-shaped members in juxtaposition, the said assembly comprising a plate-shaped support member having a hole therethrough, a stud having a stem with an enlarged head on one end and a transverse hole near the other end, said stem being rotatably extended through said hole in the support member, a rigid cam member freely slidable and rotatably supported on said stem and having a cam surface on an end face opposite to said stem head, the opposite end face of the cam member being flat, a pin having a set-off middle portion loosely fitted with its middle portion in said stem hole laterally protruding therefrom and riding upon said cam surface, rotation of said stud and said pin relative to said cam surface effecting a corresponding axial displacement of the cam member relative to the support member, the axial position of said pin on the stem fixing the maximum and the minimum distance respectively between the flat end face of the cam member and the respective side of the support member, and a vibration suppressing and elastically deformable sleeve having flat end faces rotatably and slidably supported on said stud between said support member and said cam member, one of the flat end faces of said sleeve abutting against said support member and the other against the flat end face of the cam member, the axial length of the sleeve being slightly in excess of the distance between the respective side of the support member and the respective end face of the cam member when the latter is in its axial position most distant from the support member, the said excess length of the sleeve retaining said loosely fitted pin in its centric position in the stem hole and causing a predetermined minimum outward bulging and pressure loading of the sleeve effecting an initial frictional engagement between the end faces of the sleeve and the support member and the cam member respectively sufficient to permit rotation of the stem and the pin relative to the cam surface for increasing the outward bulging and pressure loading of the sleeve to a predetermined maximum extent as determined by the axial position of said pin.

References Cited in the file of this patent

UNITED STATES PATENTS

| Number | Name | Date |
|---|---|---|
| 715,891 | Somerby | Dec. 16, 1902 |
| 1,062,635 | Clements | May 27, 1913 |
| 1,384,859 | Sartain | July 19, 1921 |
| 1,430,238 | LaBorde | Sept. 16, 1922 |
| 2,017,421 | Post | Oct. 25, 1935 |
| 2,250,343 | Zigler | July 22, 1941 |
| 2,277,885 | Rodanet | Mar. 31, 1942 |
| 2,278,217 | Rodanet | Mar. 31, 1942 |
| 2,365,372 | Allen | Dec. 19, 1944 |
| 2,370,776 | Carlson | Mar. 6, 1945 |
| 2,440,288 | Paulus | Apr. 27, 1948 |
| 2,486,670 | Nigg | Nov. 1, 1949 |
| 2,507,979 | Kelar | May 16, 1950 |
| 2,508,616 | Marty | May 23, 1950 |
| 2,644,610 | Work | July 7, 1953 |